United States Patent [19]

Tamamaki et al.

[11] Patent Number: 5,177,040

[45] Date of Patent: Jan. 5, 1993

[54] FUSED ZIRCONIA REFRACTORY MATERIALS HAVING HIGH-TEMPERATURE HEAT RESISTANCE AND CORROSION RESISTANCE AND A METHOD FOR PRODUCING THE SAME

[75] Inventors: Masahiro Tamamaki; Yoshihiro Onoda; Koji Tsuda; Hiroyuki Yamashita, all of Osaka, Japan

[73] Assignee: Japan Abrasive Co., Ltd., Osaka, Japan

[21] Appl. No.: 711,025

[22] Filed: Jun. 6, 1991

[30] Foreign Application Priority Data

Jun. 7, 1990 [JP] Japan ................................ 2-149672

[51] Int. Cl.⁵ .............................................. C04B 35/48
[52] U.S. Cl. ..................................... 501/103; 501/104
[58] Field of Search ........................ 501/103, 104, 105

[56] References Cited

U.S. PATENT DOCUMENTS

| | | | |
|---|---|---|---|
| 3,620,781 | 11/1971 | Garvie | 501/104 |
| 4,294,795 | 10/1981 | Haga et al. | 501/104 X |
| 4,975,397 | 12/1990 | Dvorah et al. | 501/104 |

FOREIGN PATENT DOCUMENTS

| | | |
|---|---|---|
| 5030035 | 9/1975 | Japan . |
| 60-51663 | 3/1985 | Japan . |
| 61-68372 | 4/1986 | Japan . |
| 62-138327 | 6/1987 | Japan . |
| 63-1274 | 1/1988 | Japan . |

*Primary Examiner*—Karl Group
*Attorney, Agent, or Firm*—Wenderoth Lind & Ponack

[57] ABSTRACT

Fused zirconia refractory materials having high-temperature resistance and corrosion resistance which includes 1-14 30 wt % of calcia and 0.05-2 wt % of yttria or rare earth minerals including yttria as a stabilizer of zirconia, which are produced by the process comprising adding and mixing calcia and yttria or rare earth minerals including yttria to zirconia materials as a stabilizer, fusing the mixed materials in an electric arc furnace, cooling slowly the fused materials to obtain an ingot, crushing the ingot to particles and oxidizing and annealing the particles.

2 Claims, No Drawings

FUSED ZIRCONIA REFRACTORY MATERIALS HAVING HIGH-TEMPERATURE HEAT RESISTANCE AND CORROSION RESISTANCE AND A METHOD FOR PRODUCING THE SAME

BACKGROUND OF THE INVENTION

1. Field of the Invention

This invention relates to a fused zirconia refractory material having high-temperature heat resistance and corrosion resistance and a method for producing the same, and more particularly to a fused zirconia refractory material of zirconia-calcia-yttria system and a method for producing the same.

2. Prior Art

Having properties such as a high melting point of about 2700° C., high corrosion resistance and low thermal conductivity, zirconia($ZrO_2$) has been generally used for refractory materials.

On the other hand, zirconia is a multi-modification mineral which is monoclinic from room temperature to about 650° C., tetragonal up to about 1100° C. and cubic up to about 2700° C. It shows an extreme thermal expansion and shrinkage of about 5% at the phase transition between monoclinic and tetragonal. Accordingly, when subjected to a heat cycle, i.e. repetition of heating and cooling, zirconia is cracked and is finally fractured.

In view of the above, zirconia for refractory materials has been stabilized to restrain the extreme thermal expansion and shrinkage by adding CaO or MgO as a stabilizer and applying a high-temperature heat treatment and thereby substituting a portion of $Zr^{4+}$ with $Ca^{2+}$ or $Mg^{2+}$ in the form of a solid solution.

Said stabilized zirconia has different properties depending upon the stabilizer and its quantity used. For example, four variations have been known when CaO is used as a stabilizer.

1) Quantity = 2.5 wt %

Stabilization rate is 60%. Grain strength is high. Thermal expansion rate is low. Hysteresis, that is, the difference between expansion rate and shrinkage factor during a heat cycle, is high.

2) Quantity = 4 wt %

Stabilization rate is about 80%. Grain strength is rather smaller than 2.5 wt % CaO. Thermal expansion rate is higher. Hysteresis is low.

3) Quantity = 7.5–12 wt %

Stabilization rate is 100%, that is a fully stabilized zirconia. Grain strength is comparatively lower and thermal expansion rate is higher in comparison with 2.5 and 4 wt % CaO. No hysteresis is observed.

4) Quantity = 25–30 wt %

Consisting of a fully stabilized zirconia and $CaZrO_3$. Grain strength is lower than 100% stabilized zirconia. No hysteresis is observed.

The development of the stabilized zirconia has contributed to the spread of a continuous casting method which can omit a reheating process of iron, and thereby the yield of products has been increased. Further, air contact can be minimized by the continuous casting method, and the quality of iron has been improved.

The stabilized zirconia refractory materials, however, are not free from a destabilization. As a result, it has not been satisfactory yet in a recent clean steel technology for producing a high tension steel. Thus the development of novel refractory materials have been strongly waited for.

CaO stabilized zirconia has been produced by adding CaO to zirconia and fusing and solidifying said mixture. In that process, there is the need to exclude carbide and dioxide produced in a fusing process and to diminish the strain in a crystal caused in cooling or in the solidifying process. Accordingly, an annealing operation was added later for oxidization and decarburization as well as removal of strain in order to restrain the occurrence of destabilization which causes the phase transition.

It is true that CaO stabilized zirconia is prevented from occurrence of destabilization in a high-temperature region of above about 1400° C. However, when it is used for a tundish nozzle brick, long nozzle brick or submerged nozzle brick in a continuous casting method, CaO elutes upon contact with a molten steel, whereby destabilization is accelerated. Further, grain strength deteriorates remarkably at a high temperature so that destruction and dissolution of the nozzle are accelerated.

On the other hand, MgO stabilized zirconia has a high strength at a room temperature. But, in a wide region of below 1100° C., periclase(MgO) and monoclinic zirconia coexist in a crystal structure, so that destabilization easily occurs at a heat cycle. In order to prevent the occurrence of destabilization, an annealing operation must be made for a long period of time, so that it is not suitable for industrial production. Furthermore, MgO mixed into a molten steel is hardly removed in a later process compared to CaO, and it forms a bar against the achievement of clean steel technology.

There have been developed various refractory materials and refractory brick in order to solve the above problems.

Japanese patent publication No. 50-30035 discloses a method for preventing the occurrence of destabilization of stabilized zirconia, which consists of processes comprising crushing a CaO or MgO stabilized zirconia into a lump, heating the crushed zirconia to higher than 1200° C., cooling it to below 900° C. and repeating said processes more than three times.

Japanese patent application laid open under No. 62-138327 discloses a method for obtaining a fused stabilized zirconia in an efficient manner without using an annealing operation for oxidation, by oxidizing fusing zirconia by $O_2$ blown into an electric furnace and modifying a stabilization rate by controlling a cooling rate for solidification.

The above two methods, however, are not practical in industrial production because the processes take much time and are very complicated. Besides, when using either CaO or MgO independently, the above mentioned problems can not be solved.

An improvement of components has been also attempted.

Japanese patent publication No. 63-1274 discloses a heat-resistant structural material of $Y_2O_3$—$ZrO_2$ system consisting of single crystal and multi crystal, which is obtained by solidifying fused materials including zirconia of 89 to 99 mol % and yttria of 1 to 11 mol %.

Japanese patent application laid open under No. 61-68372 discloses zirconia partially stabilized by yttria having high hardness and high toughness, which is obtained by cooling a uniform cubic crystal of high temperature which includes zirconia and yttria of 1–10 mol % and thereby forming a structure of rhombohedral crystal and/or tetragonal crystal.

These materials are heat-resistant structural materials which are obtained by solidifying fused materials. Although it can be conjectured that they are superior in grain strength, heat resistance and corrosion resistance, it is not practical from an economical point of view to use yttria of over 1 mol % (1.82 wt %, approximately 2 wt %) for producing refractory materials, because yttrial is expensive. Generally the addition of over 3 mol % (5.3 wt %) is required when yttria is used as a stabilizer. A large quantity of yttria which amounts to about 15 wt % is required for obtaining a fully stabilized zirconia. In case the yttria content is less than 2 wt %, stabilization effect is poor.

Another refractory material has been disclosed in the Japanese patent application laid open under No. 60-51663. Said application discloses fused cast refractories of thermal shock resistant zirconia including MgO of 1 to 5 wt % and $CeO_2$ of 0.2 to 6 wt %. But the employment of MgO badly affects the stability and the destabilization as mentioned above is apt to be induced.

As mentioned above, conventional refractory materials are not well restrained from destabilization. There are also such problems that the corrosion resistance to a molten steel is low and the processes are time consuming, complicated and uneconomical. As a result they are not suitable for the clean steel technology.

SUMMARY OF THE INVENTION

It is therefore an object of the present invention to solve all of the above problems and to provide fused zirconia refractory materials having superior properties in high-temperature heat resistance and in corrosion resistance and to provide a method for producing the same.

We have found that we can restrain the occurrence of destabilization of zirconia during a heat cycle between high temperature region and room temperature region by adding 0.05 to 2 wt % of yttria or rare earth oxide including yttria to refractory materials of zirconia-calcia system and fusing and solidifying the mixture and thereby we can obtain refractory materials having high corrosion resistance to a molten steel.

Namely, the present invention provides fused zirconia refractory materials having superior properties in high-temperature heat resistance and in corrosion resistance, which include 1 to 30 wt % of calcia and 0.05 to 2 wt % of yttria or rare earth minerals including yttria as a stabilizer.

The above refractory materials of zirconia-calcia-yttria system can be produced according to an electrofusing process using a general electric arc furnace.

Namely the method for producing fused zirconia refractory materials in accordance with the present invention comprises adding and mixing calcia and yttria or rare earth minerals including yttria as a stabilizer to zirconia materials, fusing the mixed materials in an electric arc furnace, cooling slowly and solidifying the fused materials to obtain an ingot, crushing the ingot and oxidizing and annealing the crushed materials.

The additive amount is preferred to be 1 to 30 wt % of calcia and 0.05 to 2 wt % of yttria or rare earth minerals including yttria.

DETAILED DESCRIPTION OF THE INVENTION

Although the conventional refractory materials of zirconia-calcia system can be employed in the clean steel technology by the reason that calcia eluted into a molten steel can be removed by an additional treatment, destabilization is accelerated by the elution of calcia so that grain strength deteriorates remarkably at a high-temperature region and grain fracture occurs.

On the other hand, yttria stabilized zirconia is superior in grain strength and toughness and also stable in a high-temperature region. But the additive amount is required to be more than 5 wt %. Such a large quantity of yttria is too expensive to be employed for refractory materials. Yttria stabilized zirconia is hardly eluted in a molten steel, but yttria once eluted can not be easily removed.

In accordance with the above ellucidation, we have found that we can solve the problem of refractory materials of zirconia-calcia system and provide novel refractory materials which is restrained from the occurrence of destabilization during a heat cycle between high temperature region and room temperature region and which is superior in grain strength by adding a small amount of yttria to the zirconia-calcia system.

We have confirmed that the addition of yttria is effective in every additive amount of calcia described before and that 1 to 2.5 wt % of calcia are also effective owing to the synergistic effect with yttria, so that 1 to 30 wt % of calcia may be used as a stabilizer.

The additive amount of yttria or rare earth oxide including yttria is within the range of 0.05 to 2 wt % in order to limit the use amount of expensive yttria and to minimize the contamination of a molten steel when the refractory materials including yttria are dissolved into a molten steel.

A combination of yttria with an another stabilizer such as MgO or $TiO_2$ instead of CaO is not preferred from the view point of destabilization.

Another rare earth oxides such as $CeO_2$, $Yb_2O_3$, $Gd_2O_3$, $Sm_2O_3$, $La_2O_3$, $Nd_2O_3$ or $Er_2O_3$ are not preferred because these rare earth oxides must be added in large quantities in order to accomplish the object. As a result the refractory materials obtained becomes very expensive and besides such rare earth oxides can not be easily removed when they elute in a molten steel.

The fused zirconia refractory materials in accordance with the present invention can be produced using an electrofusing process, so that refractory materials of high grain strength can be easily obtained compared with a conventional binding process or annealing process.

In accordance with the present invention, the desired fused zirconia refractory materials can be obtained by the synergistic effect of calcia and yttria or rare earth oxide including yttria used as stabilizer of zirconia.

The addition of yttria or rare earth oxide including yttria restrains the elution of calcia, so that destabilization of zirconia is effectively prevented. Grain strength does not deteriorate at a high temperature region. Corrosion resistance to a molten steel is improved so that the dissolving destructure of the refractory materials does not occur. The refractory materials obtained are available to use in the clean steel technology. By virtue of the combination with calcia, the additive amount of yttria or rare earth oxide including yttria can be decreased. As a result, the refractory materials obtained are also satisfactory from the economical point of view.

EXAMPLES

There were prepared Baddeleyite (96% $ZrO_2$) as zirconia source and quick lime (98% CaO) as calcia source. Yttria source and rare earth oxide source including yttria comprised following components shown in Table 1.

TABLE 1

| | Yttria (wt %) | Rare earth oxide including Yttria (wt %) |
|---|---|---|
| $Y_2O_3$ | 99.9 | 60 |
| $Fe_2O_3$ | 0.0015 | 0.013 |
| $Na_2O$ | 0.0015 | — |
| $K_2O$ | 0.0015 | — |
| $SiO_2$ | 0.001 | 0.05 |
| $La_2O_3$ | — | <10 |
| $CeO_2$ | — | <10 |
| $Nd_2O_3$ | — | <10 |
| $Yb_2O_3$ | — | 6 |
| $Er_2O_3$ | — | 6.5 |
| $Sm_2O_3$ | — | 2 |

Materials mixed as shown in Table 2 were fused in an electric arc furnace with the secondary voltage of 95 V, average loading electric power of 300 kW, total operation time of two hours and total amount of electric power of 600 kWh. After the operation, fused materials were cooled slowly in an atmosphere to get an ingot. The ingot obtained was then crushed into particles of below 3 mm using a crusher such as jaw crusher or roll crusher. Oxidizing and annealing treatment were then conducted using a gas furnace to remove a carbide or dioxide induced in the fusing process and also to remove a strain caused in a crystal by quenching in the cooling process. Said treatment was effected in such a manner that the temperature was raised up to 1400° C. at the rate of 5° C./min. and kept unchanged for three hours and thereafter was cooled to room temperature at the rate of 5° C./min. Samples thus obtained were classified by using a sieve to obtain the particles of 2.83–2.38 mm for measurement of stabilization rate and grain strength.

Stabilization rate is the ratio of the sum of cubic phase and tetragonal phase to total zirconia phase. It can be determined using X-ray powder diffraction method. The following arithematic equation can be used for measuring the stabilization rate $I_{(C+T)}$ on the basis of diffraction peak intensity of cubic $I_C(111)$, tetragonal $I_T(111)$, monoclinic $I_M(111)$ and $I_M(11\bar{1})$.

$$I_{(C+T)} = \frac{I_C(111) + I_T(111)}{I_C(111) + I_T(111) + I_M(111) + I_M(11\bar{1})}$$

In order to test the probability of destabilization and grain strength variation due to a heat cycle, the samples were subjected to a thermal shock test which repeated the cycle 10 times comprising heating the samples at 1450° C. for 10 minutes in a muffle furnace (ERREMA furnace) and thereafter cooling by water. The variations of stabilization rate and grain strength are as shown in Table 2. Measurement of grain strength was made using a testing machine, AUTOGRAPH of Shimazu Corporation. 50 Grains were measured in each sample and average value was determined as the grain strength (strength per grain).

TABLE 2

| | EMBODIMENTS | | | | | | | | | | COMPARISON EXAMPLES | | | | | | | | | |
|---|---|---|---|---|---|---|---|---|---|---|---|---|---|---|---|---|---|---|---|---|
| Sample No. | 1 | 2 | 3 | 4 | 5 | 6 | 7 | 8 | 9 | 10 | 11 | 12 | 13 | 14 | 15 | 16 | 17 | 18 | 19 | 20 |
| Composition (kg) | | | | | | | | | | | | | | | | | | | | |
| $ZrO_2$ | 194 | 191 | 178 | 142 | 193 | 192 | 189 | 194 | 191 | 192 | 195 | 192 | 180 | 144 | 193 | 188 | 194 | 190 | 180 | 186 |
| CaO | 4 | 7 | 20 | 56 | 7 | 7 | 7 | 4 | 7 | 7 | 5 | 8 | 20 | 56 | 7 | 7 | — | — | — | — |
| $Y_2O_3$ | 2 | 2 | 2 | 2 | 0.1 | 1 | 4 | — | — | — | — | — | — | — | 0.05 | 5 | 6 | 10 | 20 | — |
| Rare oxide including $Y_2O_3$ | — | — | — | — | — | — | — | 2 | 2 | 1 | — | — | — | — | — | — | — | — | — | 14 |
| Stabilization efficiency (%) | | | | | | | | | | | | | | | | | | | | |
| Original | 60 | 80 | 100 | 100 | 74 | 76 | 100 | 55 | 75 | 72 | 60 | 80 | 100 | 100 | 70 | 100 | 25 | 50 | 100 | 60 |
| After thermal shock | 55 | 78 | 100 | 100 | 65 | 68 | 100 | 50 | 70 | 67 | 40 | 60 | 85 | 86 | 57 | 100 | 5 | 40 | 100 | 50 |
| Reduction Rate | 8.3 | 2.5 | 0 | 0 | 12 | 11 | 0 | 9.1 | 6.7 | 6.9 | 33 | 25 | 15 | 14 | 19 | 0 | 80 | 20 | 0 | 17 |
| Strength per grain (kg/piece) | | | | | | | | | | | | | | | | | | | | |
| Original | 80 | 75 | 60 | 45 | 72 | 73 | 60 | 80 | 74 | 70 | 65 | 62 | 42 | 35 | 65 | 55 | 55 | 65 | 55 | 60 |
| After thermal shock | 70 | 70 | 52 | 40 | 66 | 67 | 57 | 68 | 67 | 64 | 42 | 38 | 30 | 25 | 50 | 50 | 40 | 55 | 50 | 55 |
| Reduction rate | 13 | 6.7 | 13 | 11 | 8.3 | 8.2 | 5.0 | 15 | 9.5 | 8.6 | 35 | 39 | 29 | 29 | 23 | 9.1 | 27 | 15 | 9.1 | 8.3 |
| Dissolving destructure (index) | | | | | | | | | | | | | | | | | | | | |
| | 45 | 40 | 50 | 60 | 50 | 50 | 45 | 50 | 45 | 55 | 95 | 100 | 120 | 200 | 85 | 50 | 60 | 55 | 50 | 50 |

Reduction rate of the stabilization rate and deterioration rate of strength per grain shown in Table 2 are represented by the percentage of the difference between an original value and a value after thermal shock to the original value.

In order to test the corrosion resistance, test pieces of zirconia-carbon system of $20 \times 20 \times 100$ mm were prepared by mixing 80 parts by weight of the above samples below 3 mm, 13 parts by weight of F.C and 7 parts by weight of SiC. Said test pieces were subjected to a corrosion test using a cryptol furnace. In addition to said test pieces, iron and continuous casting powder were loaded. After one hour operation at 1600° C., the test pieces were cooled and dissolving destruction was determined at a cut surface. The results are shown in Table 2 in the form of index by setting the amount of dissolving destruction of Sample No. 12 (4 wt % calcia—96 wt % zirconia) to be 100.

In Table 2, samples No. 11 to 15 in comparative examples are conventional calcia stabilized zirconia which includes no yttria or which includes a very small amount of yttria. The stabilization rate thereof is originally 60–100%, but 40–86% after the thermal shock test, which shows 14–33% reduction. The deterioration rate of strength per grain is as high as 23–39%.

Samples No. 17 and 18 are other comparative examples i.e. yttria stabilized zirconia which includes yttria only. Both the stabilization rate and the deterioration rate after the thermal shock test is not preferred.

Samples No. 16, 19 and 20 in comparative examples show preferable results in the stabilization rate, grain strength and dissolving destruction. But they are not practical in the industrial production because yttria is expensive and the removal of yttria eluted in a molten steel is difficult.

On the contrary, samples No. 1–10 which are the embodiments of the present invention show preferable results. Namely the reduction rate of stabilization rate is less than 12% and the deterioration rate of grain strength is less than 15%.

Additionally the dissolving destruction of samples No. 1–10 is less than 60 while conventional calcia stabilization zirconia shows the dissolving destructure of 95–200.

As mentioned above, the refractory materials of zirconia-calcia-yttria system in accordance with the present invention have such superior properties that the grain strength is high at a room temperature, the destabilization of zirconia and the reduction of grain strength caused by a heat cycle are restrained and the amount of dissolving destruction is small, that is, the corrosion resistance is high. Accordingly, the refractory materials in accordance with the present invention are preferably used in the clean steel technology.

We claim:

1. In a fused zirconia refractory material comprising zirconia and a stabilizer therefor, the improvement wherein the refractory material contains, as stabilizer, 1 to 30 weight percent calcia and 0.05 to 2 weight percent yttria or a rare earth mineral including yttria.

2. In a method for the production of a fused zirconia refractory material comprising incorporating a stabilizer into zirconia, the improvement wherein 1 to 30 weight percent calcia and 0.05 to 2 weight percent yttria or a rare earth mineral including yttria are added to and mixed with a zirconia material, the resultant mixture is fused in an electric arc furnace, the fused material is coated slowly to obtain an ingot, the ingot is crushed and the crushed material is oxidized and annealed.

* * * * *

UNITED STATES PATENT AND TRADEMARK OFFICE
CERTIFICATE OF CORRECTION

PATENT NO. : 5,177,040
DATED : January 5, 1993
INVENTOR(S) : MASAHIRO TAMAMAKI, YOSHIHIRO ONODA, KOJI TSUDA and HIROYUKI YAMASHITA It is certified that error appears in the above-indentified patent and that said Letters Patent is hereby corrected as shown below:

Column 4, line 55, change "destructure" to --destruction--.

Column 7, line 22, change "destructure" to --destruction--.

Column 8, line 22, change "coated" to --cooled--.

Signed and Sealed this

Fifth Day of July, 1994

Attest:

BRUCE LEHMAN

Attesting Officer     Commissioner of Patents and Trademarks